United States Patent
Johnson et al.

[11] Patent Number: 6,161,460
[45] Date of Patent: Dec. 19, 2000

[54] BEARING ASSEMBLY FOR SHEAR

[75] Inventors: Kenneth C. Johnson, Bloomingdale; Christopher A. Zurek, Crystal Lake, both of Ill.

[73] Assignee: Littell International, Inc., Addison, Ill.

[21] Appl. No.: 09/247,708

[22] Filed: Feb. 9, 1999

Related U.S. Application Data

[62] Division of application No. 08/696,132, Aug. 13, 1996, Pat. No. 5,901,627.

[51] Int. Cl.⁷ .............................. B26D 5/00; B27B 11/02
[52] U.S. Cl. ............................... 83/821; 83/613; 83/694; 83/699.11; 83/824; 83/828
[58] Field of Search ............................ 83/388, 389, 390, 83/452, 588, 582, 457, 613, 699.11, 821, 824, 825, 827, 828, 829, 694

[56] References Cited

U.S. PATENT DOCUMENTS

| | | | |
|---|---|---|---|
| 3,678,792 | 7/1972 | Dvorak | 83/639 |
| 3,803,968 | 4/1974 | Black | 83/825 |
| 3,822,622 | 7/1974 | Smith et al. | 83/621 |
| 4,128,027 | 12/1978 | Fuchs | 83/552 |
| 4,172,401 | 10/1979 | Terrado Albareda | 83/639 |
| 4,204,450 | 5/1980 | Le Guelennec | 83/636 |
| 4,245,532 | 1/1981 | Astill et al. | 83/282 |
| 4,494,428 | 1/1985 | Malof | 83/389 |
| 5,123,829 | 6/1992 | Eason et al. | 83/613 |
| 5,195,414 | 3/1993 | Ogasawara | 83/389 |
| 5,363,729 | 11/1994 | Ogasawara | 83/389 |
| 5,472,367 | 12/1995 | Slocum et al. | 451/5 |
| 5,784,938 | 7/1998 | Watkins et al. | 83/528 |

*Primary Examiner*—M. Rachuba
*Assistant Examiner*—Sean Pryor
*Attorney, Agent, or Firm*—Richard G. Lione; Brinks Hofer Gilson & Lione

[57] ABSTRACT

The present invention relates to a shearing system. The shearing system includes a die assembly having linear bearings and guide rails for guiding movement of the upper die shoe. Gas springs return the die shoe to the open position.

3 Claims, 13 Drawing Sheets

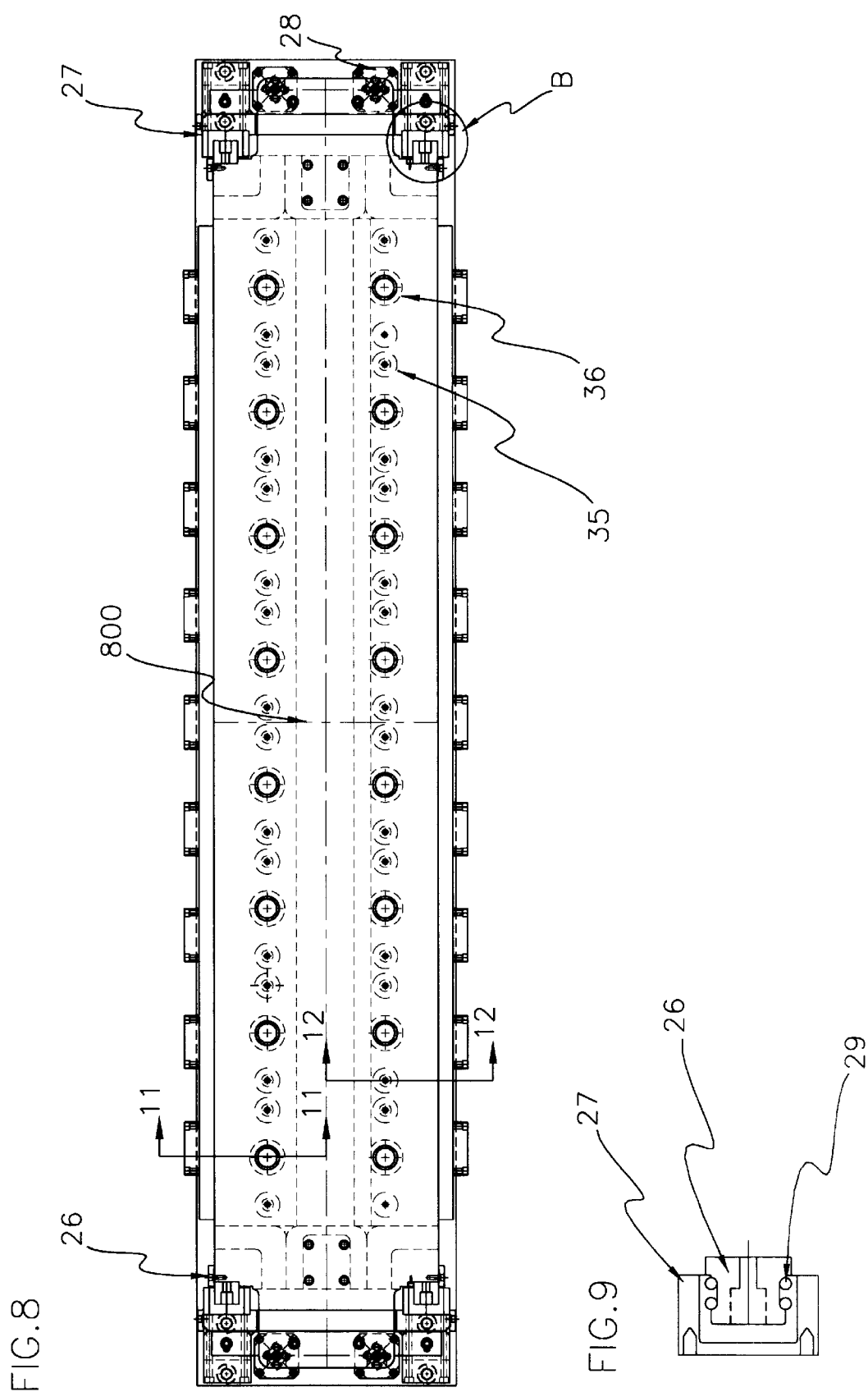

BEARING ASSEMBLY FOR SHEAR

RELATED APPLICATIONS

This application is a division of application Ser. No. 08/696,132, filed Aug. 13, 1996 now Pat. No. 5,901,627.

FIELD OF THE INVENTION

This invention relates generally to shearing systems. It relates more particularly to apparatus and a method for clamping and shearing sheet material and, specifically, to a method for shearing sheet steel to prepare it for laser welding.

BACKGROUND OF THE INVENTION

In general, shearing systems consist of a shear assembly having an upper and lower frame, and a slide plate. A die assembly with upper and lower shoes is positioned within the shear assembly. Each of the shoes includes a clamp arrangement and blade arrangement. Sheet material such as sheet metal to be cut is placed in a gap between the upper and lower shoes and is positioned with guide apparatus. Hydraulic cylinders are used to drive the slide downward against the upper shoe, depressing it. As the upper shoe is depressed in a downward stroke, first an upper clamp contacts the sheet metal and presses it against a lower clamp. As the upper shoe continues its downward stroke, the sheet is sheared by an upper blade sliding past lower blades.

One problem with conventional shearing systems is that often the sheet is clamped with a bend or a wave in it. This causes the sheet to be sheared while it is not perfectly flat. Accordingly, when the sheet springs back to its pre-clamped state, the sheet has a cut-edge which is not as straight as was intended.

Another problem with conventional shearing systems is that sheet metal may be only partially sheared. In other words, the cut-edge of the sheet may have a rough and pitted area resulting from splitting or breaking rather than from the shearing action of the blades. The rough and pitted area may be difficult to weld to another sheet.

Another problem with conventional shearing systems is that the guide for upward movement of the upper shoe works against the guide for downward movement of the upper shoe. Accordingly, the guides incur increased wear.

It would be desirable to have a shearing system that would clamp the sheet without trapping waves or bends so that a straight cut would be achieved. It would also be desirable to have a blade arrangement that would maximize the actual shearing of the metal sheet with minimal breakage of the cut-edge. It would also be desirable to have a die assembly guide arrangement which would provide a smooth transition between the open and closed position of the die assembly and reduce wear on the guides.

SUMMARY OF THE INVENTION

The invention includes apparatus for clamping sheet material to be sheared including a die shoe, and a plurality of spring clamping members positioned longitudinally along the die shoe. The clamping members are positioned in raised, stepped sequence outwardly from the centerline of the shoe, perpendicular to the longitudinal sides of the shoe, whereby they sequentially contact the sheet. Each of the clamping members may include a guide pin positioned between two mechanical springs.

The clamping apparatus may further include a second shoe with a clamp opposing the clamping members on the first die shoe to securely hold a sheet during the shearing operation. The first and second die shoes are preferably upper and lower die shoes, respectively. The clamp and the clamping members preferably each include a sandblasted and chromed, sheet contact surface. The second die shoe may include an opening formed therein for allowing the scrap cut from the sheet to fall onto a conveyer traveling in a direction parallel to the longitudinal side of the second die shoe.

The invention further includes a method of clamping sheet material to be sheared. A die assembly, including first and second die shoes with opposing clamps, is provided. The first die shoe clamp comprises a plurality of clamping members. The sheet material is contacted with these clamping members positioned on opposite sides of, and adjacent to, a centerline, perpendicular to the longitudinal sides of the die assembly. The sheet material is sequentially contacted with the clamping members beginning at the centerline and proceeding outwardly from the centerline, to secure the sheet between the first and second clamps prior to shearing.

The invention further includes apparatus for shearing sheet material which includes the die assembly with the first and second die shoes. In the apparatus the first die shoe is adapted to slidably fit in a shear assembly. Linear bearings are positioned in the shear assembly adjacent the corners of the die assembly. A guide rail is slidably fitted in each of the linear bearings to guide the movement of the first die shoe toward the second die shoe. Gas springs are positioned adjacent each of the linear bearings, which gas springs are adapted to compress during the movement of the first die shoe toward the second die shoe and then expand to force the first die shoe back to an open position, all without working against the shear guide posts. Preferably, the linear bearings extend beyond a cut line. This arrangement adds rigidity and stability to the die assembly. The linear bearings each preferably comprises a U-shaped channel member, which contains 1 ball bearings, to allow the guide rail to move vertically within the linear bearing.

The invention further includes a method of shearing sheet material. According to the method, a first or upper die shoe of the die assembly is guided downwardly along the linear bearings, while simultaneously compressing the gas springs. The gas springs then expand to reposition the upper die shoe of the die assembly.

The invention further includes apparatus for shearing sheet material which includes a cutting blade adapted to be attached to a die shoe. The blade is positioned at an angle to the horizontal. This results in the cut-edge of the sheet having a higher percentage of sheared surface area and a lower percentage of broken surface area. Preferably, the cutting blade is positioned at an angle of between about 0.2 and 0.5 of a degree from the horizontal. The apparatus may further include a second cutting blade, adapted to be attached to a second shoe which blade has a rake design. The second blade preferably has a rake of approximately 3/16 inch per foot.

The invention further includes apparatus for shearing sheet material wherein the shear assembly includes an upper frame and a lower frame, bolted together. The upper frame includes a hydraulically operated slide plate. The die assembly includes an upper shoe and lower shoe. The upper shoe includes an upper clamp and an upper blade. The lower shoe includes a lower clamp plate and a lower blade.

The upper clamp includes a plurality of spring-loaded clamping members which press downwardly upon the sheet material, sequentially outwardly from adjacent and center line extending perpendicular to a longitudinal side of the die assembly. These clamping members secure the sheet material to the lower clamp when the upper shoe and upper clamp are pressed downwardly by the slide plate.

The lower frame may include hydraulically controlled locating pins which are received in openings formed in a bottom portion of the lower shoe. The die assembly may also include a plurality of linear bearings with guide rails for guiding the upper shoe when it is driven downward by the slide plate. The die assembly may also include a plurality of gas springs which compress while the upper shoe is driven downward by the slide plate, and expand after the slide plate is retracted to force the upper shoe upwardly to an open position. The spring-loaded clamping members may include at least one mechanical spring and a guide pin. The invention may further include a torque tube which is oriented longitudinally in said shear assembly and is connected to a cam which pivots vertically and is trapped between the slide plate and a bearing housing. The torque tube maintains the slide plate in parallel relationship with the lower frame.

The apparatus of the invention may further include a scrap conveyer assembly. The scrap conveyer assembly is positioned within the shear assembly, perpendicular to the direction of sheet insertion into the die assembly.

It is to be understood that both the foregoing general description and the following detailed description are exemplary and explanatory and are intended to provide further explanation of the invention as claimed.

The invention, together with further objects and attendant advantages, will best be understood by reference to the following detailed description of the presently preferred embodiment of the invention, read in conjunction with the accompanying drawings.

BRIEF DESCRIPTION OF THE DRAWINGS

FIG. 8 is a top elevational view of the die assembly of FIG. 7;

FIG. 9 is an enlarged view of the guidance assembly in the die assembly shown within the inscribed area designated B of FIG. 8;

DESCRIPTION OF THE PREFERRED EMBODIMENT

Figure 1:
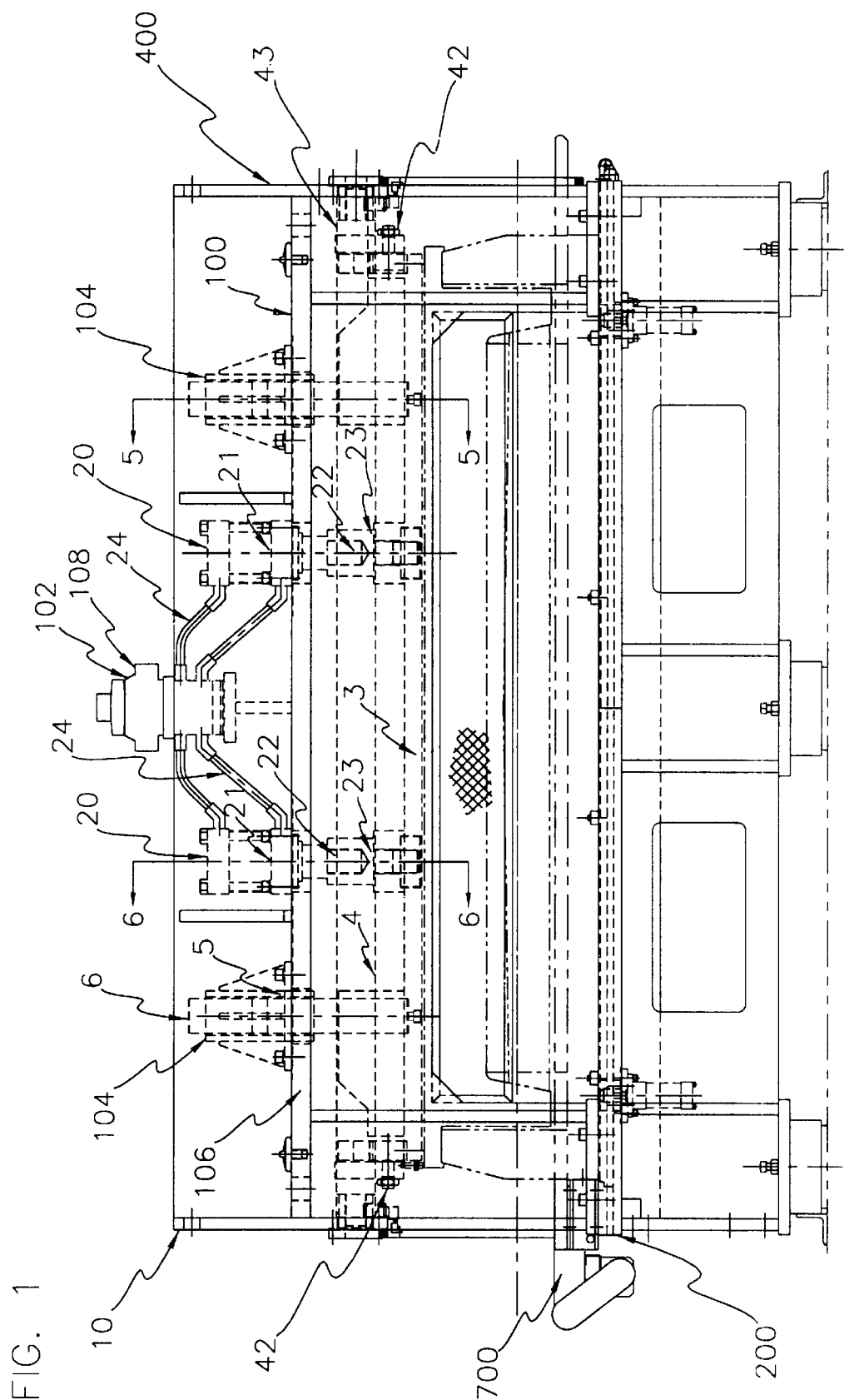
FIG. 1 is a front elevational view of a preferred embodiment shear system.

Referring now to the drawings, and particularly to FIGS. 1–4, a preferred embodiment of a shearing system is shown at 10. The shearing system 10 may be used as a stand alone shearing production system or in conjunction with other systems in larger processes, such as with a laser welding system. The shearing system 10 preferably cuts material without significantly deforming the edges of the material. In the preferred embodiment, the shearing system 10 includes a shear assembly 400, a die assembly 500 (see FIGS. 7–10) and a conveyer assembly 700.

Figure 5:
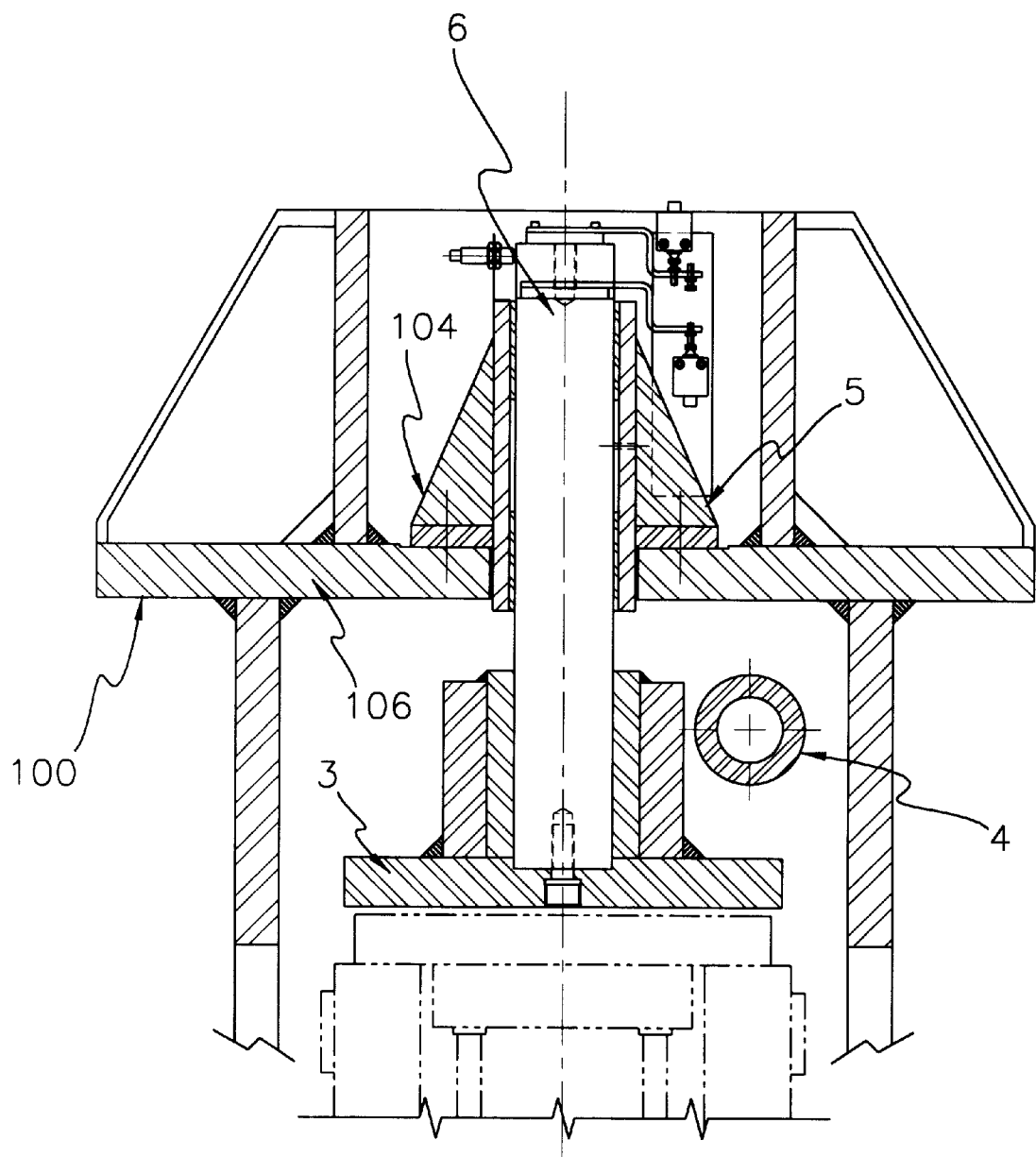
FIG. 5 is a sectional view taken along line 5—5 of FIG. 1, showing the guiding system of the upper frame.

The shear assembly 400 includes an upper frame 100 and a lower frame 200. The upper frame 100 includes top plate 106, piston-cylinder sub-assemblies 20, guide sub-assembly 104, and slide plate 3. The upper frame 100 may be attached to the lower frame 200 by any conventional means, such as screws or bolts. The guide sub-assembly 104 includes a plurality of guide post(s) 6, each of which slide within a bushing 5. As shown in FIG. 5, the bushings 5 are mounted to the top plate 106 by any conventional means, such as bolts or the like. The guide post(s) 6 are fastened to the slide plate 3 by any conventional means.

Figure 6:
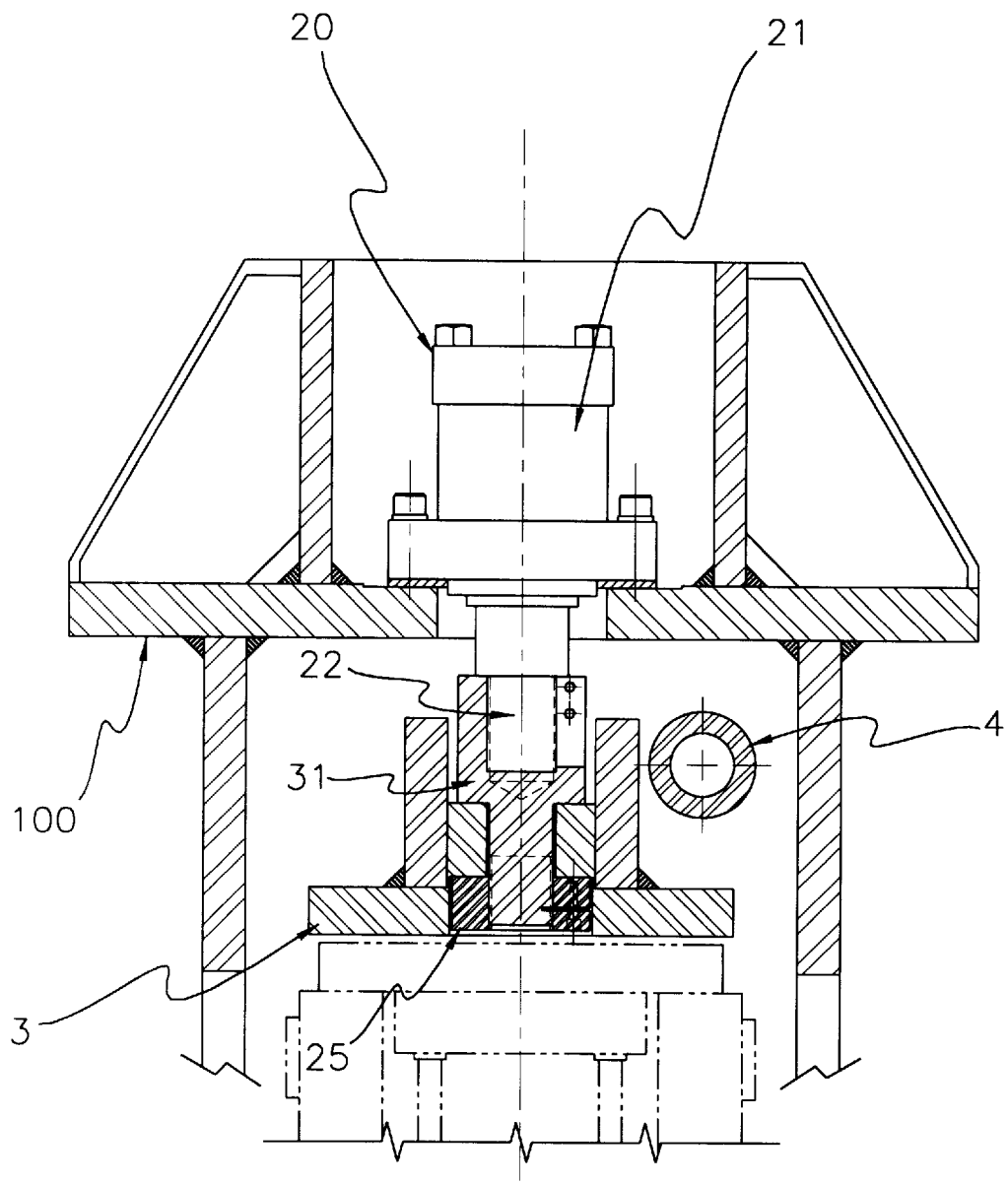
FIG. 6 is a sectional view taken along line 6—6 of FIG. 1, showing the drive mechanism of the upper frame.

Referring to FIG. 1, two piston-cylinder sub-assemblies 20 and a control mechanism 108 are mounted to the top plate 106. As shown in FIG. 6, each piston cylinder assemblies 20 includes a cylinder 21 which is attached to the top plate 106 by any conventional means, such as bolts or the like. Sliding within cylinder 21 is a shaft 22, which is screwed into nut assembly 31. Nut assembly 31 is attached to slide plate 3 with a nut 25. As those skilled in the art will appreciate, the piston-cylinder assembly 20 may comprise a variety of devices and may be constructed in any suitable manner.

The control mechanism 108 is preferably a solenoid valve and includes hydraulic piping 24 for connecting to the piston cylinder assembly 20. The control mechanism 108 is preferably connected to an electrical power source (not shown). When the control mechanism 108 is activated, the slide plate 3 may be reciprocated between an extended and retracted position. Preferably, the slide plate 3 is made from steel.

Referring to FIGS. 1–5, the guide sub-assembly 104 of the upper frame 100 preferably includes a torque tube 4 which includes an elongated tubular member 43 and a pair of end members 42. The end members 42 are secured to the upper frame 100. The torque tube 4 is connected to cam 44, which pivots as shown at 45 in FIGS. 2 and 3, and is trapped between slide plate 3 and a bearing housing 46 to maintain the slide 3 in a parallel relationship with the lower frame assembly 200.

Figure 2:
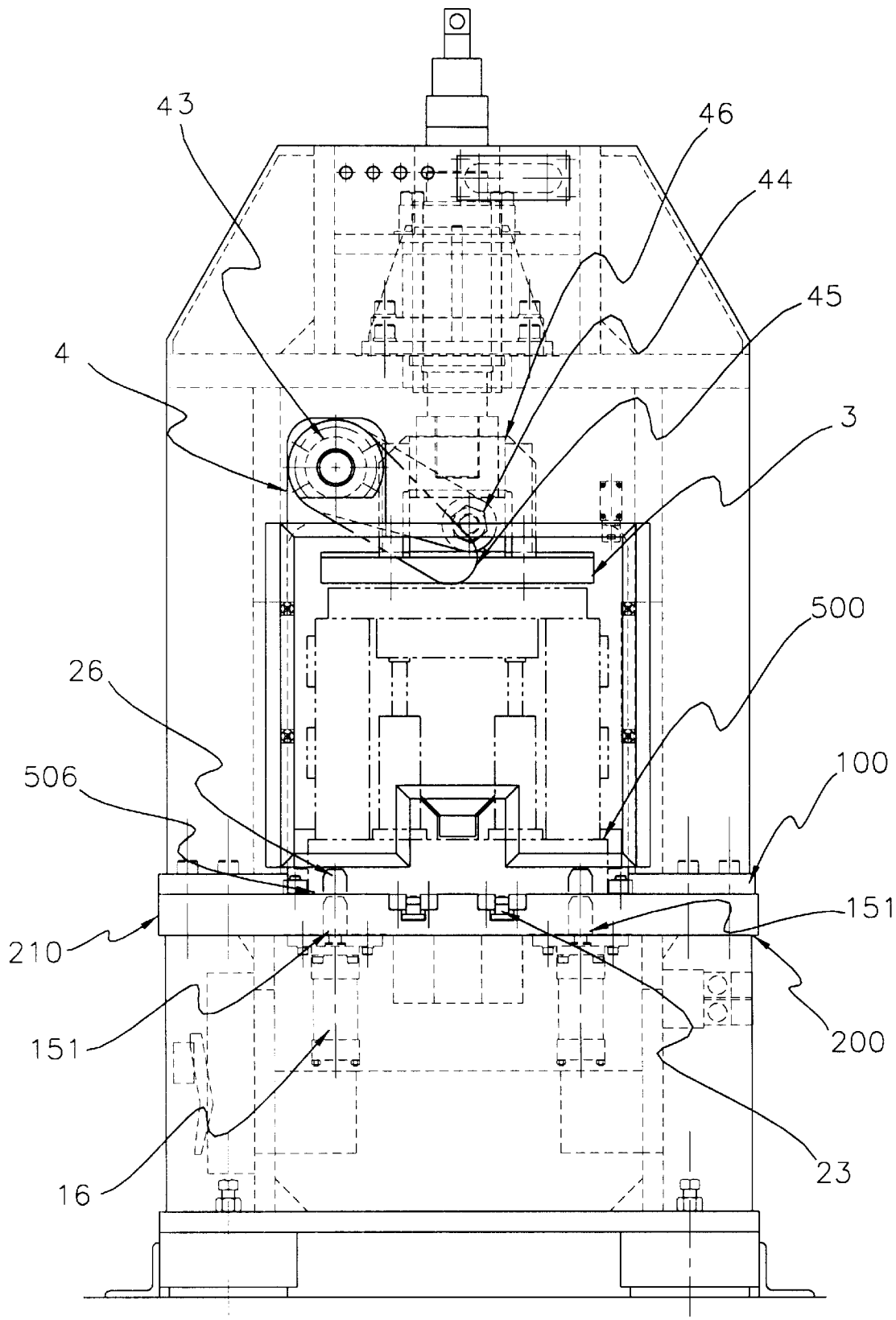
FIG. 2 is a left side elevational view of the shear system of FIG. 1.
Figure 3:
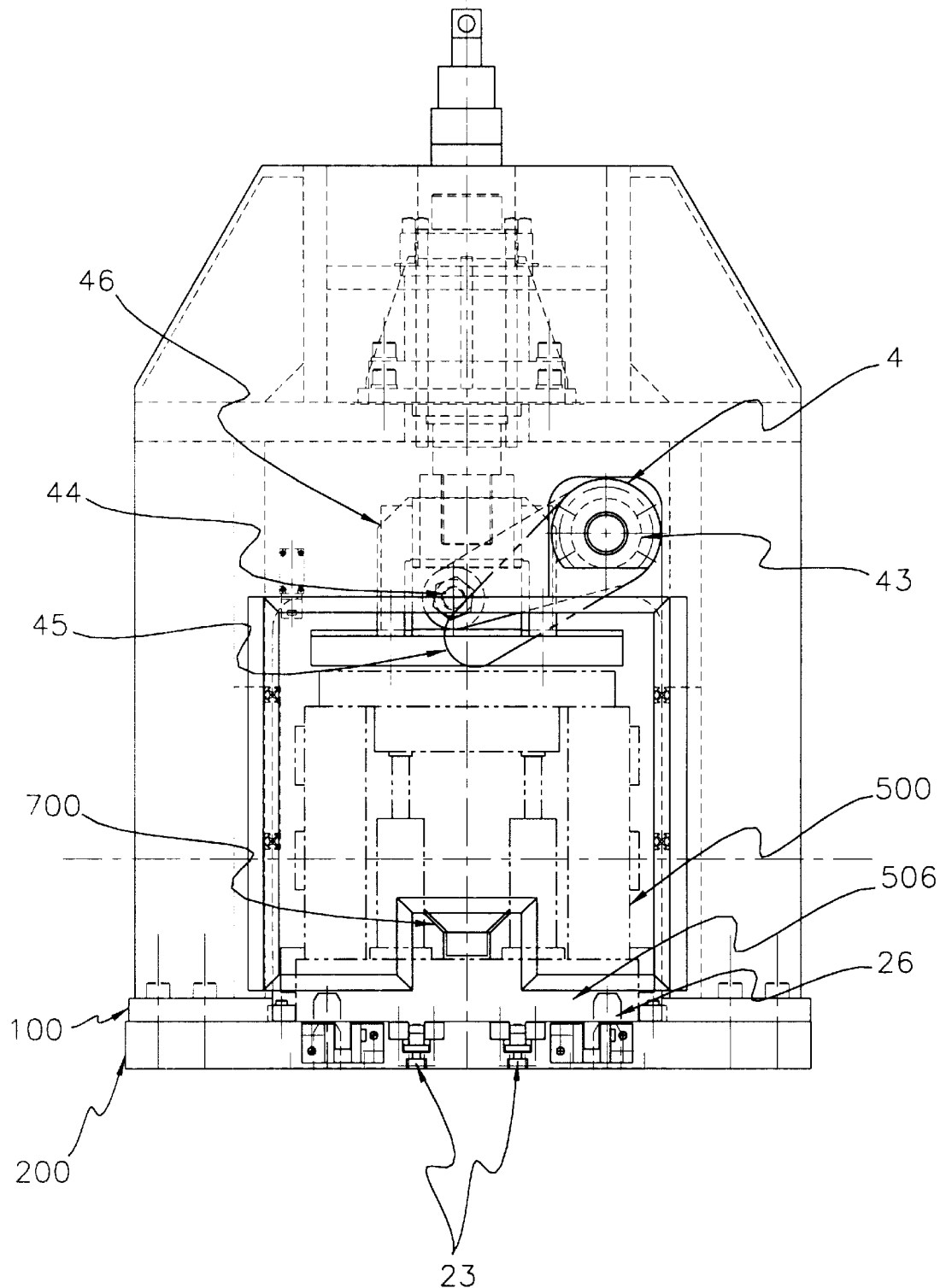
FIG. 3 is a right side elevational view of the shear system of FIG. 1.
Figure 4:
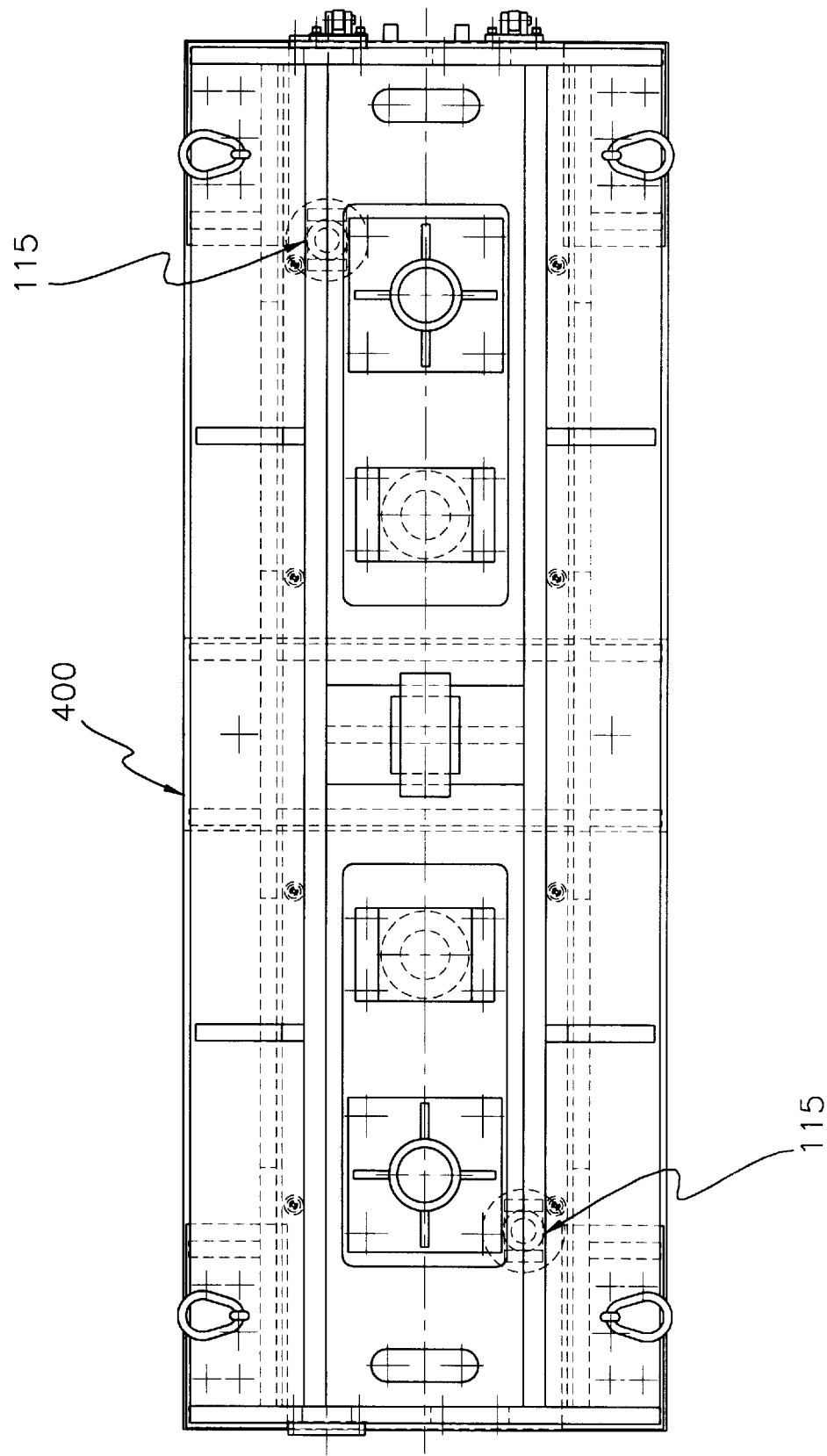
FIG. 4 is a top elevational view of the shear system of FIG. 1.

As shown in FIG. 2, the lower frame 200 is preferably bolted to the upper frame 100. The lower frame 200 preferably is made of steel, and receives and supports the die assembly 500. The die assembly 500 has an upper shoe 502 and a lower shoe 504, which preferably includes lower plate 506 bolted thereto.

When the die assembly 500 is inserted into the shear assembly 400, locating pins 115 are used to locate the die assembly 500 within the shear assembly 400. The pins 115 are preferably located on opposite sides, and diagonally across from each other, and are received within hydraulic cylinders 16, which are fastened to the lower frame assembly 200. The lower plate 506 has openings 26 formed in its bottom to receive the pins 115.

Preferably, a plurality of die assembly lifters 23 are also mounted on lower frame 200. They are powered by a hydraulic system (not shown) to lift the die assembly 500 approximately ⅛ inch relative to the shear assembly 400 to allow its removal from the shear assembly.

The die assembly 500 is positioned on the shear bed 219 of the lower frame 200. Preferably, the die assembly 500 is an independent cassette that can be removed from the shear bed 210. The cassette die assembly 500 may be removed by using a winch to move it along roller bearings on the shear bed 210, while the die lifters 23 are in their extended position. It is contemplated that the upper and lower frames, as well as the upper and lower die shoes, may be inverted.

Figure 11:
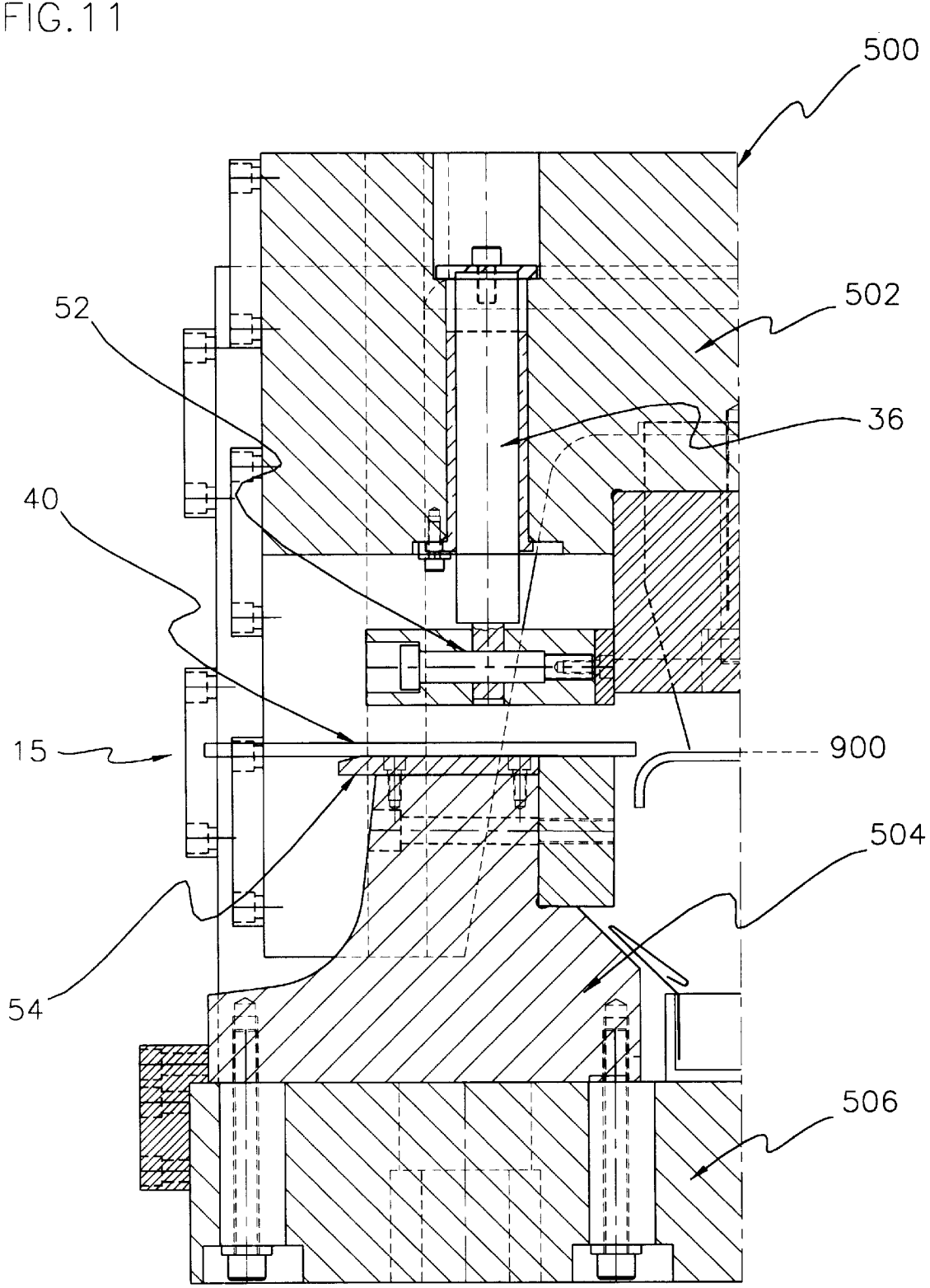
FIG. 11 is a sectional view taken along line 11—11 of FIG. 8, and shown at the top of the shear stroke.
Figure 12:
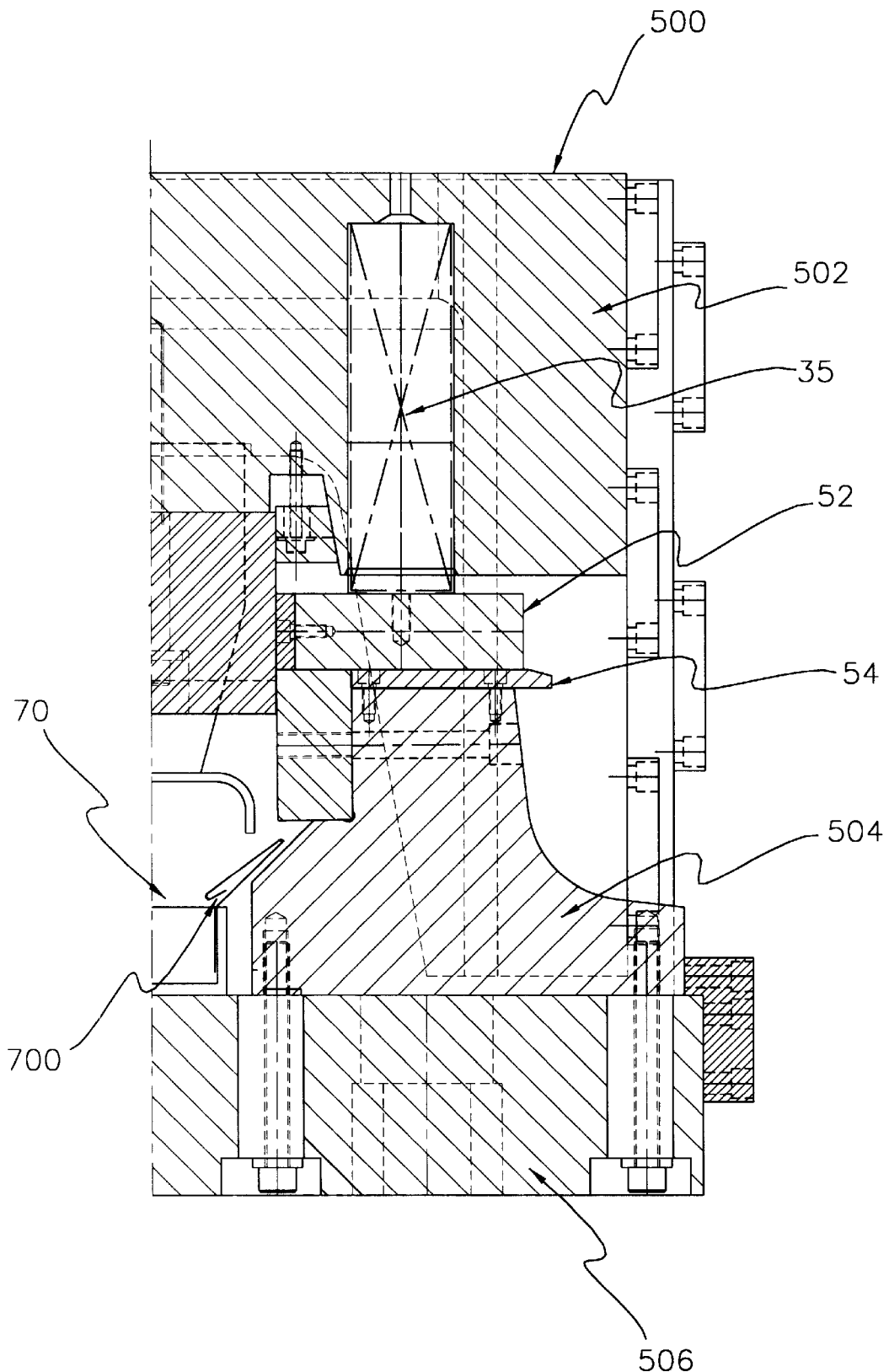
FIG. 12 is a sectional view taken along line 12—12 of FIG. 8, and shown at the bottom of the shear stroke.

Referring to FIG.11, the upper shoe 502 and the lower shoe 504 are shown positioned in the open position at the top of a shearing stroke. Sheet material (or) stock 40 is fed into the opening formed between the upper shoe 502 and lower shoe 504, in the direction indicated by arrow 15. Preferably, the die assembly 500 also allows the operator to simultaneously insert two pieces of stock from opposite sides of the die assembly 500 i.e., a second piece of stock in the direction opposite of arrow 15, as shown for example in FIG. 15. In FIG. 12, the die assembly 500 is shown at the bottom of the shearing stroke (no stock shown).

The conveyer assembly 700 is positioned in a center opening 70 formed in the lower shoe 504, upon the lower plate 506. The conveyer assembly 700 is designed to carry the sheared blank scrap out of the shear area. The conveyer assembly 700 removes the scrap, which is sheared from the sheets 40, in a direction transverse to the direction of insertion 15 of the stock. This conveyor 700 can be interfaced with an external conveyor and scrap chopper (not shown).

Figure 13:
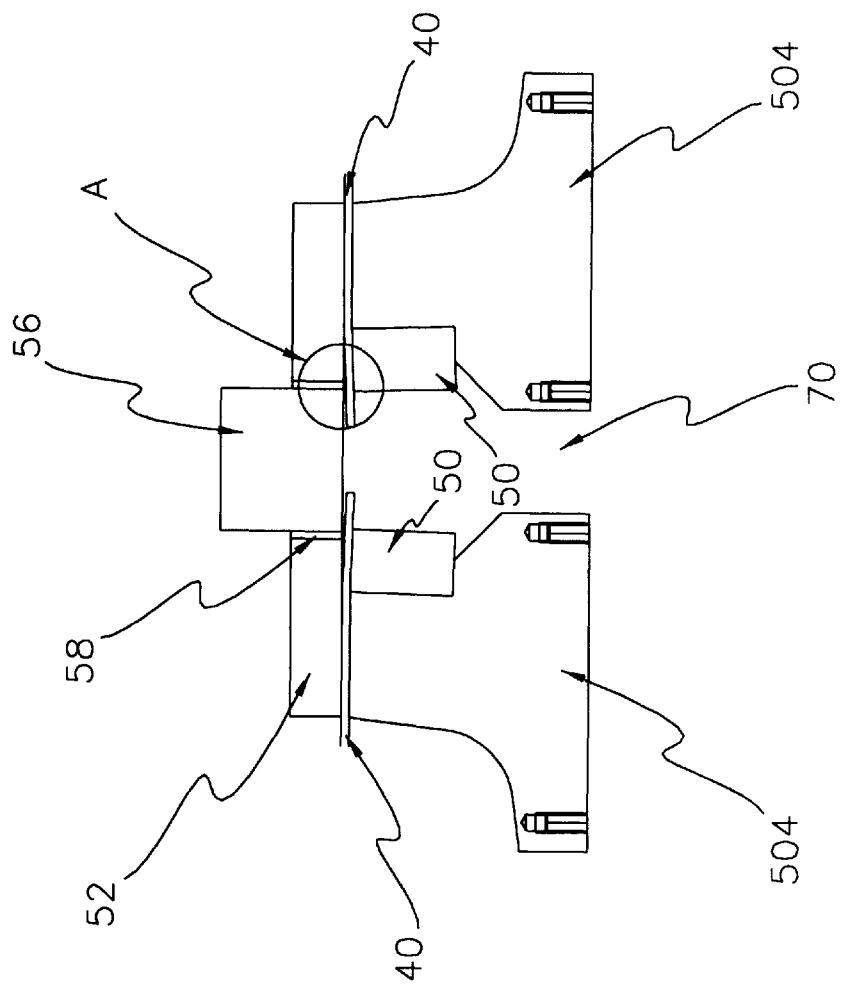
FIG. 13 is a sectional view of an upper blade in contact with a preferred tapered lower blade.

Referring to FIGS. 11–13, the lower shoe 504 includes lower clamps 54, (only one shown). A pair of lower blades 50 are positioned on each side of the center of the die assembly 500 in the opening which allows for blanks or stock 40 to be simultaneously inserted from opposite sides of the die assembly 500.

Figure 14:
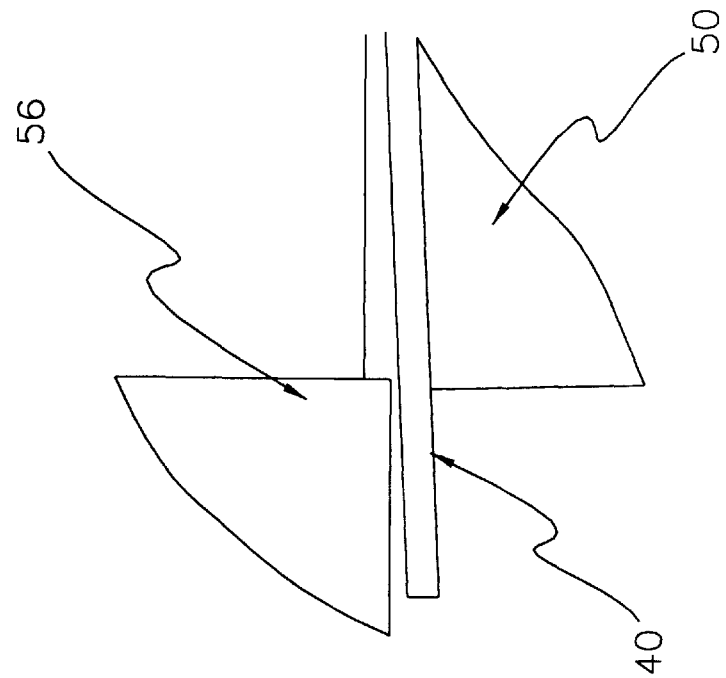
FIG. 14 is an enlarged view of the inscribed area designated A shown in FIG. 13.

The pair of lower blades 50 are detachably mounted to the lower shoe 504 by any conventional means, such as bolts. The pair of lower blades 50 have a substantially flat bottom surface and vertical side walls. The top surface of the lower blades 50 are angled downward, as shown in FIGS. 13 and 14. The blades are preferably fabricated from steel or the like.

The upper shoe 502 of the die assembly 500 includes an upper blade 56 and upper clamps 52. The upper shoe 502 is contacted and depressed by the slide plate 3 (see FIG. 6) in the upper frame 100 during the shearing operation. The upper blade 56 is preferably bolted to the upper shoe 502. The upper blade 56 interfaces with both of the lower blades 50 in order to provide simultaneous cuts on material received from either side of the shearing system.

The upper blade 56 is preferably of one piece construction and has a bow tie or rake design. Preferably, the rake angle is approximately ³⁄₁₆ inch per foot. The upper blade 56 is preferably fabricated from tool steel or the like.

The upper blade 56 is in slidable contact with the upper clamps 52. A wear plate 58 is fastened to each clamp 52. A wear plate 58 is fastened to each clamp 52 and provides a wear surface for the slidable contact with the upper blades 56. The wear plate 58 is preferably made of bronze.

Figure 7:
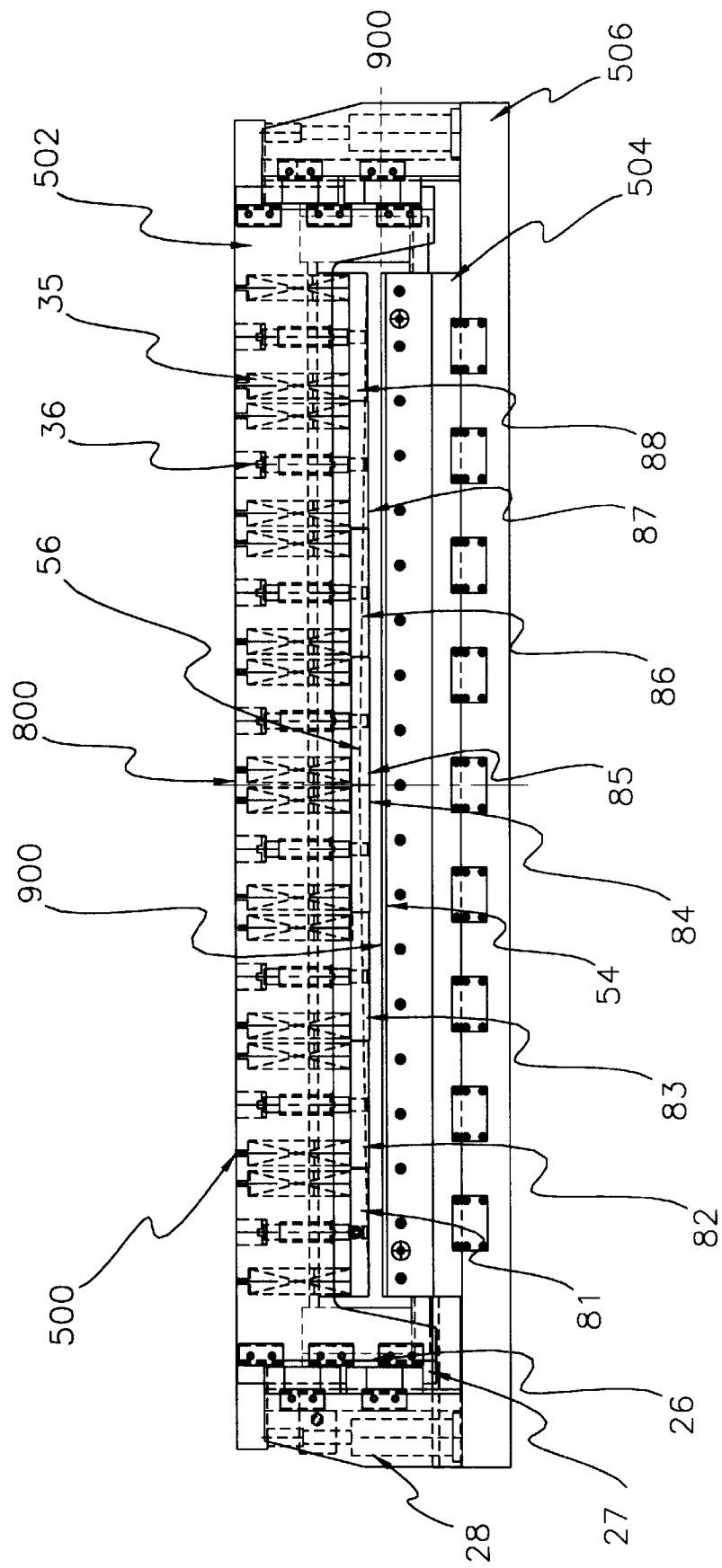
FIG. 7 is a front elevational view of a preferred embodiment die assembly.

Referring to FIGS. 7–9, the guidance system for the die assembly 500 includes four vertical guide rails 26. Each of the guide rails 26 is positioned within a linear bearing 27, which is preferably high precision and pre-loaded. Preferably the linear bearings 27 extend down below cut-line 900 which runs along the top edge of the lower clamp(s) 54 to provide additional strength and rigidity to the die assembly 500. As seen in FIG. 9, each guide rail 26 is guided by ball bearings 29 which allow for vertical movement of the guide rail 26 within the linear bearing 27.

The clamping sub-assembly of the die assembly 500 registers and holds the sheet material during the shearing process. The clamping sub-assembly preferably holds the sheet material in a rigid, predictable, and controlled fashion.

Referring to FIGS. 11 and 12, the clamping sub-assembly includes the upper clamps 52 and lower clamps 54. The lower clamps 54 are preferably steel plates which support the sheet material or stock 40 (see FIG. 11) during operation.

Preferably, the clamping surfaces of the upper and lower clamps 52, 54 have a textured finish to them to securely grip the sheet material and prevent slippage or movement during cutting. To this end, the clamping surfaces of the upper and lower clamps 52, 54 are preferably sandblasted and coated with chrome. The upper and lower clamping surfaces of the clamps 52, 54 are preferably nominally measured at approximately 400 RMS. The clamps 52, 54 hold the sheet material 40 securely during the shear cut, without marking the blank during this process.

Referring again to FIGS. 7–8, the upper clamps 52 may, for the embodiment shown, include a set of eight, spring-loaded clamping segments 81–88. One set is longitudinally positioned along each side of the upper shoe 502.

Each clamping segment 55 in a set preferably includes a guide pin 36 positioned between two mechanical springs 35. When the upper shoe 502 is compressed by downward movement of the slide 3, the upper clamps 52 move downward to engage the sheet. They engage sequentially outwardly from the centerline 800 of the die assembly 500. The two center clamping segments 84, 85, positioned adjacent opposite sides of the centerline 800, engage and clamp the blank first. This is because the center segments are positioned slightly lower than the next segments 83, 86. Subsequently, in sequence outwardly from the centerline 800, each of the additional clamping segments engage and clamp the blank. Thus for the embodiment shown, clamping segments contact the sheet in the following sequence: first segments 84, 85; second segments 83, 86; third segments 82, 87; and fourth segments 81, 88. Preferably each of the clamping pairs are approximately 0.40 inches lower than the previous pair. The sheet material is, thus, effectively ironed outwardly from the centerline 800 so as not to trap any waves in the sheet material.

In operation, sheet material stock may be fed into the shearing system from either side, or it may be fed from both sides simultaneously. when the material is in position, the piston-cylinders 20 are activated to move the slide 3 downwardly to contact the upper shoe 502 of the die assembly 500. The slide 3 forces the upper shoe 502 downwardly, causing the upper clamps 52 to move downwardly and secure the sheet material.

Figure 10:
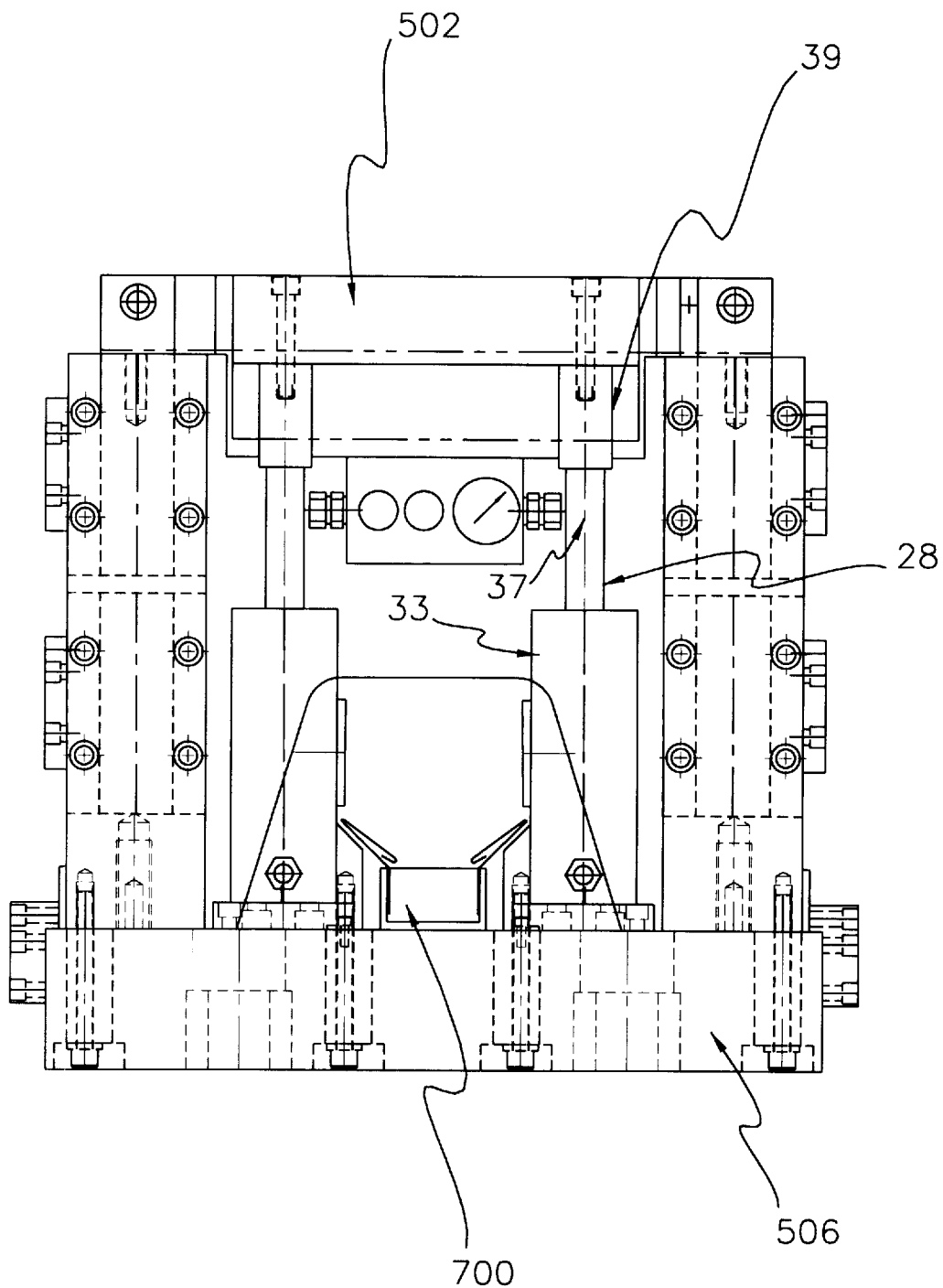
FIG. 10 is a side elevational view of the die assembly of FIG. 7.

Referring to FIG. 10, for the embodiment shown, four gas springs 28 contained in the die assembly 500 are compressed as the upper shoe 502, with its raked upper blade 56, descends in a controlled and guided manner in the opening 70 in the lower shoe 504. The upper sheet blade 56 cuts the material along the edges of the lower blade 50.

The gas springs 28 each include a cylinder 33, which is preferably bolted to the lower plate 506, and a shaft 37 that slidably fits within the cylinder 33. The shaft 37 is engaged against spacer bar 39 which is bolted to the upper shoe 502. As the slide 3 of the shear assembly retracts, the upper shoe 502 is raised as the gas springs 28 expand.

This design allows the linear bearings 27 and guide rails 26 to guide the downstroke of the upper shoe 502. It also allows the gas springs 28 to return the die assembly 500 to the open position without working against the guide post(s) 6.

The shearing system which has been described provides sheet metal cut-edges which meet the precise criteria required for successful laser welding. The sheet material will have a substantially perpendicular cut-edge after shearing. The straightness of the cut-edge of the sheet material will be within a 0.0015 inch variation over the length.

Figure 17:
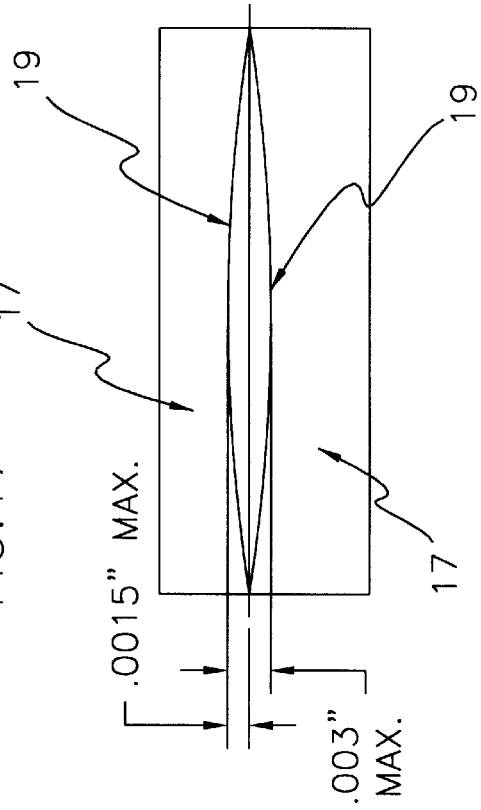
FIG. 17 is a side view of two sample cut sheets with the cut edges abutting each other.
Figure 18:
FIG. 18 is a side view of two sample cut sheets with the cut edges abutting each other.
Figure 15:
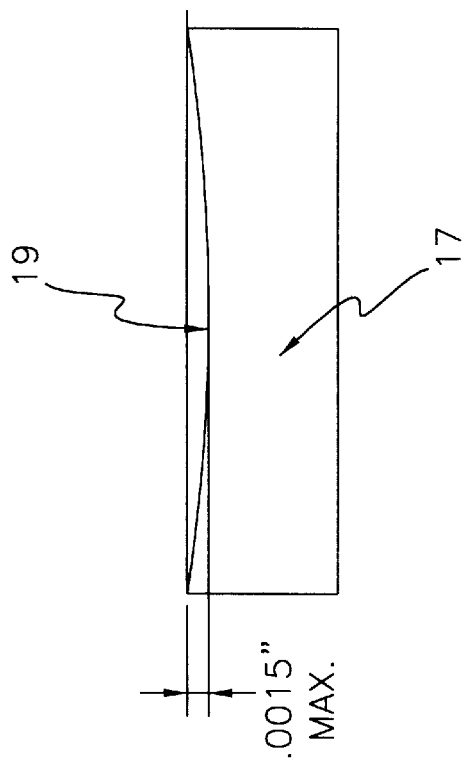
FIG. 15 is a side view of a sample cut sheet, showing tolerances.
Figure 16:
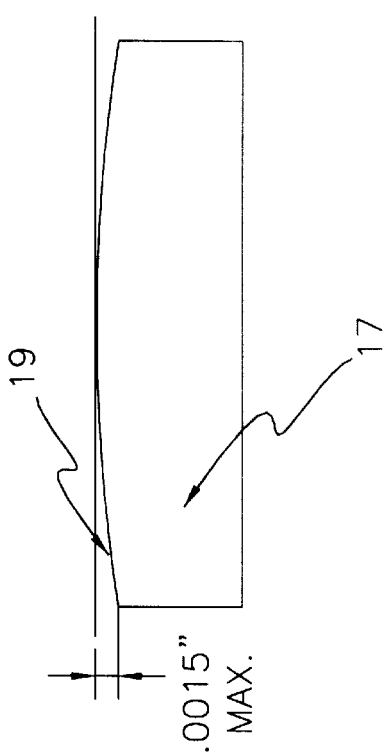
FIG. 16 is a side view of a sample cut sheet, showing tolerances.

Referring to FIGS. 15–18, sheets 17 sheared according to the present invention are shown having cut-edges 19 with a maximum tolerance of 0.0015 inch. FIGS. 15 and 16 show sheets 17 having maximum concave and convex cut-edges 19, respectively. FIG. 17 shows the convex sheets in position for laser welding with a maximum tolerance of 0.0015 inch for each of the cut-edges, FIG. 18 shows the concave cut sheets in position for laser welding, and having a maximum tolerance on cut-edges of 0.0015 inch.

The shearing system 10 also produces cut-edges having a minimum break-to-shear ratio, as well as providing repeatability. Referring to FIGS. 13 and 14, the lower blade 50 is shown to be angled at between about 0.2 and 0.5 of a degree from the horizontal. This blade angle produces a cut-edge which may be approximately 85 percent sheared and only approximately 15 percent broken.

Preferably, the specified rating of the shearing system 10 is about 85 tons. The shearing system may be equipped with all safety interlocks and die blocks.

It is contemplated that the shearing system 10 could be implemented to receive any desired number of sheet metal components. it could also be implemented to receive sheet metal components of different thickness and/or physical properties.

Although the present invention has been described in detail by way of illustration and example, it should be understood that a wide range of changes and modifications can be made to the preferred embodiment described above without departing in any way from the scope and spirit of the invention. Thus, the described embodiment is to be considered in all respects only as illustrative and not restrictive, and the scope of the invention is, therefore, indicated by the appended claims rather than the foregoing description. All changes that come within the meaning and range of equivalency of the claims are to be embraced within their scope.

What is claimed is:

1. In a shearing system for shearing a metal sheet, the improvement comprising:

a) a die assembly including an upper die shoe, a lower die shoe and a lower die plate, said lower die shoe being mounted on said lower die plate;

b) said upper die shoe being movable vertically relative to said lower die shoe to shear said metal sheet at a cut line between said upper and lower die shoes;

c) a plurality of vertical linear bearings mounted on said lower die plate, each of said linear bearings extending vertically through said cut line;

d) a corresponding plurality of vertical guide rails mounted on said upper die shoe and extending downwardly in bearing relationship into corresponding vertical linear bearings; and e) driving means for driving said upper die shoe toward said lower die shoe whereby said metal sheet is sheared at said cut line between said upper and lower die shoes while said upper die shoe is guided in its vertical travel by said vertical linear bearings.

2. The improvement in a shearing system of claim 1 further characterized in that:

a) said die assembly has four corners and a vertical guide rail is mounted on said upper die shoe adjacent each of said four corners; and b) a vertical linear bearing is mounted on said lower die plate adjacent each of said four corners;

c) a corresponding guide rail extending in bearing relationship in each of said four linear bearings.

3. The improvement in a shearing system of claim 2 further characterized in that:

a) said driving means comprises a hydraulic cylinder for driving said upper die shoe toward said lower die shoe; and b) a gas spring is disposed between said lower die plate and said upper die shoe adjacent each of said linear bearings, each of said gas springs being compressible during movement of said upper die shoe towards said lower die shoe and, when pressure is removed from said hydraulic cylinder, expandable to force the upper die shoe upwardly.

* * * * *